(12) United States Patent
Zink, Jr. et al.

(10) Patent No.: US 7,703,233 B2
(45) Date of Patent: Apr. 27, 2010

(54) AVIAN DECOY

(75) Inventors: Fred Lee Zink, Jr., Port Clinton, OH (US); Thomas B. J. Matthews, Memphis, TN (US)

(73) Assignee: Avery Outdoors, Inc., Memphis, TN (US)

( * ) Notice: Subject to any disclaimer, the term of this patent is extended or adjusted under 35 U.S.C. 154(b) by 200 days.

(21) Appl. No.: 12/075,795

(22) Filed: Mar. 13, 2008

(65) Prior Publication Data

US 2009/0229165 A1 Sep. 17, 2009

(51) Int. Cl.
*A01M 31/06* (2006.01)

(52) U.S. Cl. .................................... 43/3; 43/2
(58) Field of Classification Search .............. 43/2, 43/3; 446/320
See application file for complete search history.

(56) References Cited

U.S. PATENT DOCUMENTS

| 1,822,763 | A |   | 9/1931  | Cook |
| 2,601,088 | A | * | 6/1952  | Burgess ...................... 248/539 |
| 3,205,613 | A | * | 9/1965  | Hammond .................... 446/51 |
| 3,470,645 | A |   | 10/1969 | Mattson |
| 5,168,649 | A |   | 12/1992 | Wright |
| 5,172,506 | A |   | 12/1992 | Tiley et al. |
| 5,279,063 | A | * | 1/1994  | Heiges ............................ 43/3 |
| 5,636,466 | A | * | 6/1997  | Davis ............................. 43/3 |
| 6,216,382 | B1|   | 4/2001  | Lindaman |
| 6,481,147 | B2|   | 11/2002 | Lindaman |
| 6,572,432 | B1| * | 6/2003  | Tsai ........................... 446/320 |
| 2004/0084577 | A1 |   | 5/2004 | McMahan |
| 2006/0053675 | A1 |   | 3/2006 | Lindaman |

* cited by examiner

*Primary Examiner*—Kimberly S Smith
*Assistant Examiner*—Joshua J Michener
(74) *Attorney, Agent, or Firm*—Walker, McKenzie & Walker, P.C.

(57) ABSTRACT

An avian decoy comprising a body having a hollow interior; a support movable between a retracted position and an extended position; and an extremity movable between a retracted position and an extended position; the extremity including a foot and a leg; the leg having a first end positioned within the hollow interior of the body and having a second end attached to the foot.

7 Claims, 3 Drawing Sheets

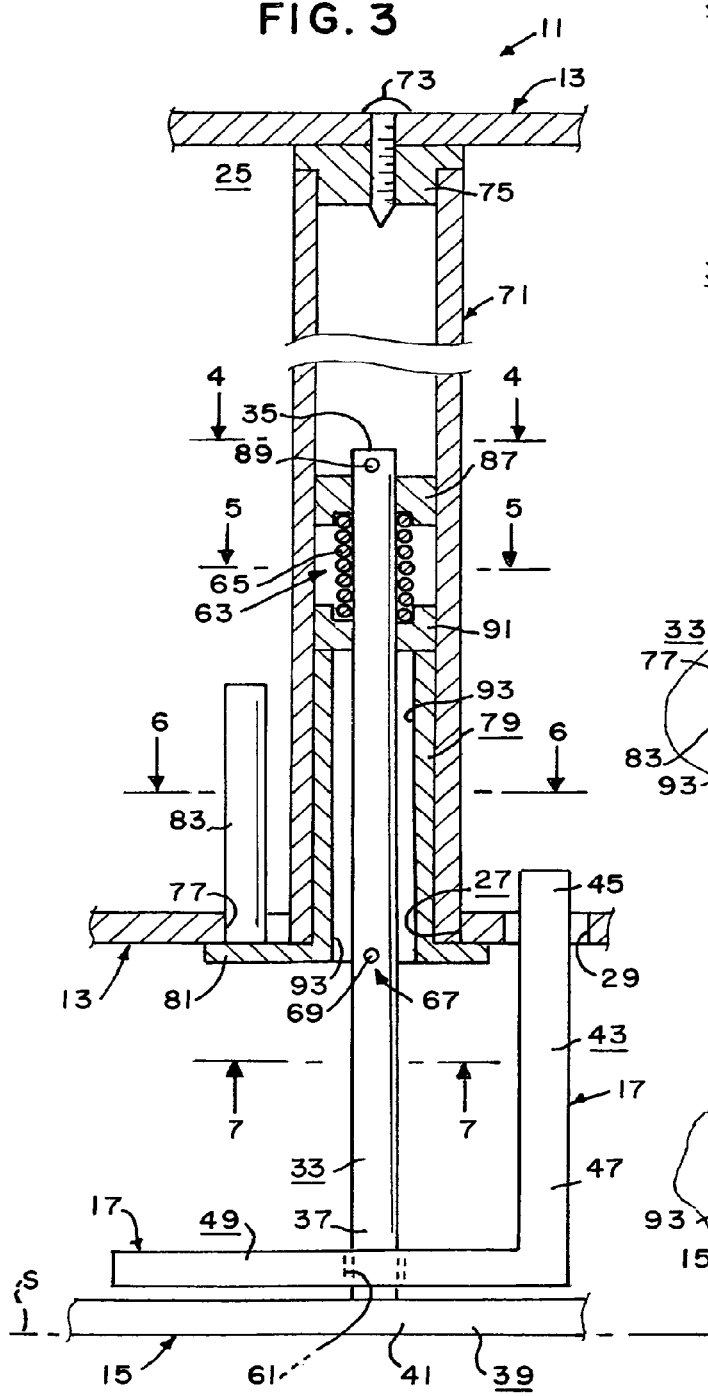
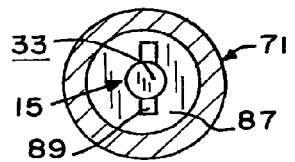
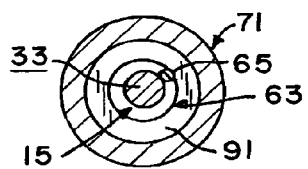
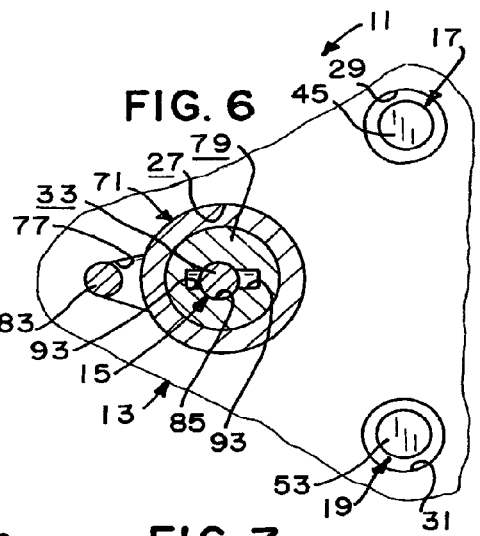
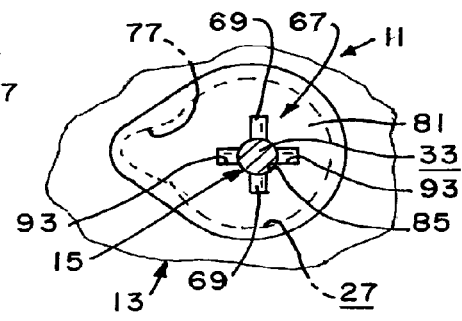

AVIAN DECOY

BACKGROUND OF THE INVENTION

1. Field of the Invention

The present invention relates, in general, to avian decoys, and in particular, to an avian decoy having retractable legs.

2. Background Art

It is often desired to have a decoy spread (a plurality of duck or geese decoys arranged on a field or the like) with one or more of the decoys providing the appearance of a standing duck or goose.

It is also desired for such decoys to have realistic looking legs and feet.

It is also desired for such decoys to be compact for easy transport and storage.

A preliminary patentability search in Class 43, subclasses 2 and 3, produced the following documents, some of which may be relevant to the present invention:

Lindaman, U.S. Patent Application 2006/0053675, published Mar. 16, 2006, discloses a hunting decoy for fowl, having a support shaft that can include a ground piercing stake in a manner that allows the decoy body and head to move, or bobble, independently of one another.

McMahan, U.S. Patent Application 2004/0084577, published May 6, 2004, discloses a decoy stand that includes a base, a pivot rod extending substantially normal to the base, and a bracket to couple the pivot rod to a decoy so that the decoy can move about the pivot rod.

Lindaman, U.S. Pat. No. 6,481,147, issued Nov. 19, 2002, discloses a hunting decoy having a collapsible hollow body, and a ground engaging stake to which the body is mounted in such a way so as to have a fore-and-aft bobbing motion.

Lindaman, U.S. Pat. No. 6,216,382, issued Apr. 17, 2001, discloses an internal support for collapsible hunting decoys so that the body of the decoy will open or expand when the support is expanded or rotated a certain way.

Heiges, U.S. Pat. No. 5,279,063, issued Jan. 18, 1994, discloses a wild game decoy with a flexible, reconfigurable neck.

Tiley et al., U.S. Pat. No. 5,172,506, issued Dec. 22, 1992, discloses a wind-sock type goose decoy.

Wright, U.S. Pat. No. 5,168,649, issued Dec. 8, 1992, discloses a turkey decoy which can be moved between a standing posture and a mating posture.

Mattson, U.S. Pat. No. 3,470,645, issued Oct. 7, 1969, discloses a decoy having a collapsible frame including padded body and neck elements, and a weighted flexible cover.

Cook, U.S. Pat. No. 1,822,763, issued Sep. 8, 1931, discloses a decoy having a collapsible body.

Nothing in the known prior art discloses or suggests the present invention.

BRIEF SUMMARY OF THE INVENTION

The present invention provides an avian decoy, having a support and extremities that allow it to be placed in fields or the like in a realistic standing position.

It is an object of the present invention to provide such a decoy in which the support and extremities can be easily and quickly moved to raised, retracted positions for allowing easy and compact transport and storage thereof.

BRIEF DESCRIPTION OF THE SEVERAL VIEWS OF THE DRAWINGS

FIG. 3 is a sectional view substantially as taken on line 3-3 of FIG. 1, with portions broken away for clarity.

FIG. 4 is a sectional view substantially as taken on line 4-4 of FIG. 3, with portions omitted for clarity.

FIG. 5 is a sectional view substantially as taken on line 5-5 of FIG. 3, with portions omitted for clarity.

FIG. 6 is a sectional view substantially as taken on line 6-6 of FIG. 3, with portions broken away and omitted for clarity.

FIG. 7 is a sectional view substantially as taken on line 7-7 of FIG. 3, with portions broken away and omitted for clarity.

DETAILED DESCRIPTION OF THE INVENTION

Figure 1:
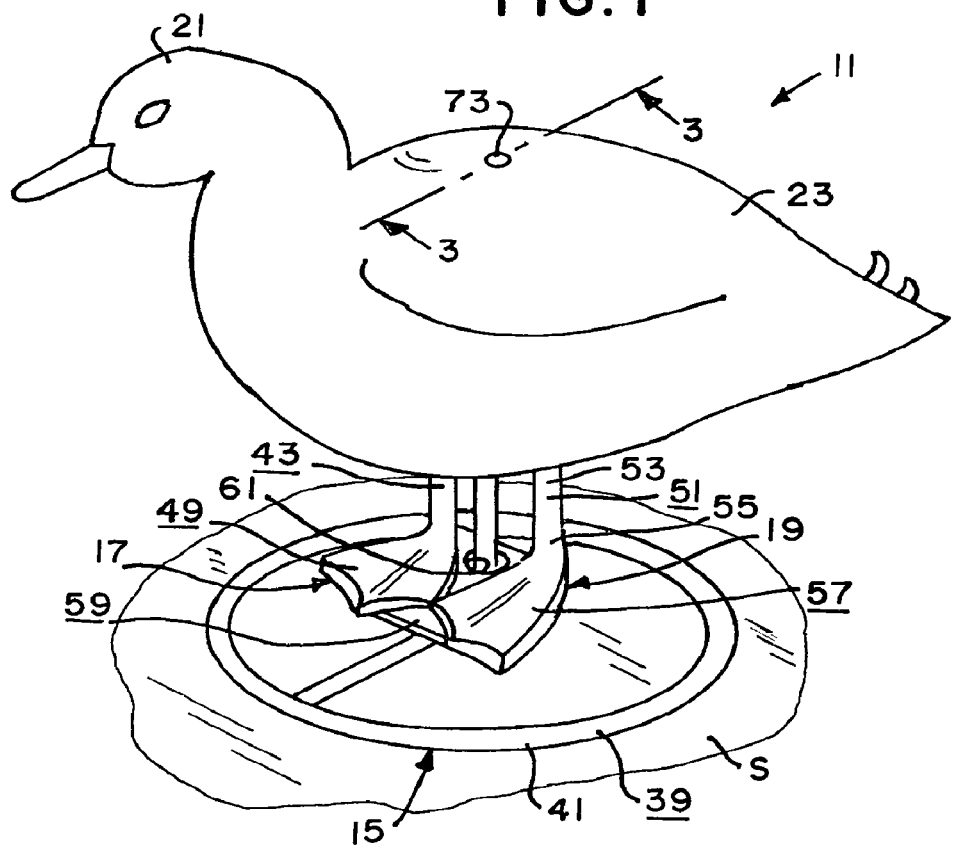
FIG. 1 is a perspective view of the avian decoy of the present invention, shown in a standing position.

A preferred embodiment of the avian decoy of the present invention is shown in the drawings, and identified by the numeral 11. The decoy 11 includes, in general, a decoy body 13, a support 15 for supporting the decoy body 13 on a support surface S such as the ground, a right extremity 17, and a left extremity 19.

The body 13 includes a head portion 19 and a body portion 21, configured and colored to closely resemble an actual duck, goose, etc. The body 13 has a hollow interior 25. The body 13 has a first or support aperture 27 in the bottom thereof communicating with the hollow interior 25 thereof, a second or right extremity aperture 29 in the bottom thereof communicating with the hollow interior 25 thereof, and a third or left extremity aperture 31 in the bottom thereof communicating with the hollow interior 25 thereof. The hollow interior 25 may be large, substantially filling both the head portion 21 and body portion 23 of the body 13, to reduce the weight of the decoy 11, etc., or may be just sufficient to allow portions of the support 15 and extremities 17, 19 to enter the body 13 as will hereinafter become apparent to those skilled in the art. The body 13 may be constructed as a one piece, integral unit or may be constructed as a multi-piece unit with, for example, the head portion 19 and body portion 21 being constructed as separate units and joined to one another via an attachment means or the like. The body 13 may be molded or otherwise constructed out of various materials such as plastic (e.g., polyvinyl chloride—PVC) in various shapes and sizes. The actual construction, size, and appearance of the body 13 may vary depending on the user's desires. For example, the decoy body 13 may have the general appearance of a feeder duck or goose, a looker duck or goose, an active duck or goose, etc., as will now be apparent to those skilled in the art.

Figure 2:
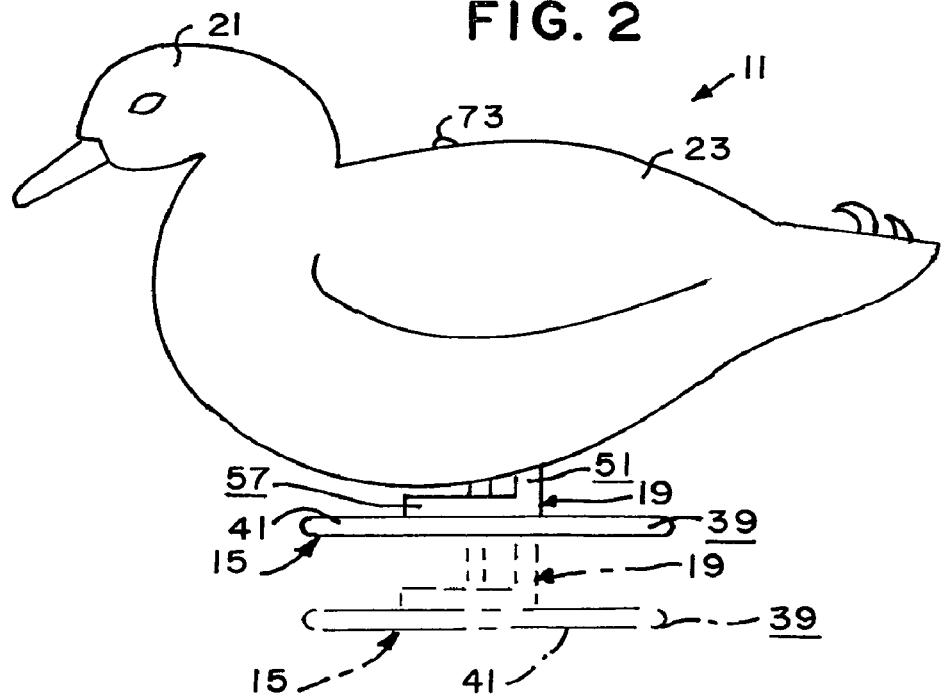
FIG. 2 is a side elevational view of the avian decoy of the present invention, shown in a retracted position in solid lines and in a standing position in broken lines.
Figure 8:
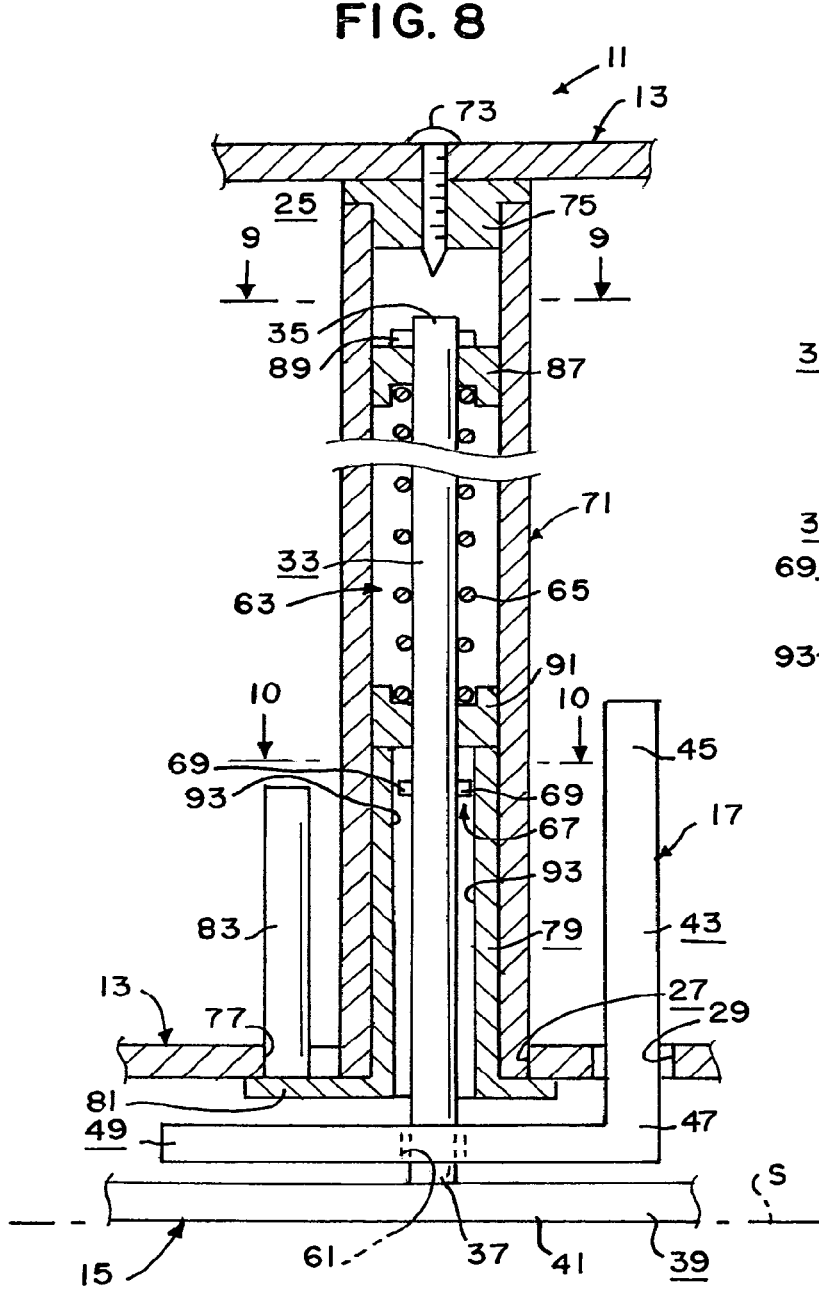
FIG. 8 is a sectional view substantially similar to FIG. 3 but with the decoy in a retracted position.
Figure 9:
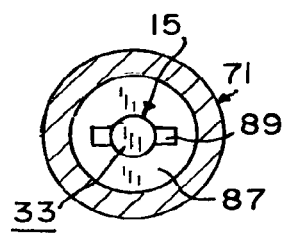
FIG. 9 is a sectional view substantially as taken on line 9-9 of FIG. 8, with portions omitted for clarity.
Figure 10:
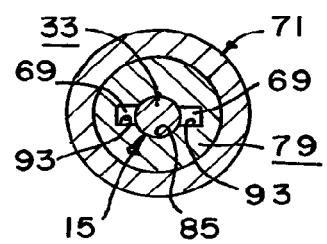
FIG. 10 is a sectional view substantially as taken on line 10-10 of FIG. 8, with portions omitted for clarity.

The support 15 includes a shaft 33 having a first or upper end 35 extending through the support aperture 27 in the body 13 and into the hollow interior 25 of the body 13, and a second or lower end 37. The lower end 37 of the shaft 33 is preferably positioned proximal or adjacent the body 13 (i.e., close to the bottom of the body 13) when the support 15 is in the retracted position (see, e.g., FIG. 8) and distal or away from the body 13 (i.e., spaced away from the bottom of the body 13) when the support 15 is in the extended position (see, e.g., FIG. 3). The support 15 may include a base 39 attached to the lower end 37 of the shaft 33 for engaging and resting upon the support surface S. The base 39 may consist of an elongated continuation of the shaft 33, having a pointed or sharpened end for being pushed or driven into the support surface S. However, as clearly shown in FIGS. 1 and 2, the base 39 may consist of a plate-like construct 41 for merely sitting or resting on top of the support surface S. The support 15 may be constructed as a one piece, integral unit or may be constructed as a multi-piece unit, out of various materials and in various shapes and sizes. For example, the support 15 may be formed, bent, or otherwise constructed out of metal rod, with the shaft 33 consisting of a straight, elongated length of metal rod, and with the base 39 consisting of a circular piece of metal rod attached to or formed integral with the lower end 37 of the shaft 33 by a connecting length of metal rod.

The right extremity 17 includes a leg 43 having a first or upper end 45 extending through the right extremity aperture 29 in the body 13 and into the hollow interior 25 of the body 13, and a second or lower end 47. The lower end 47 of the leg 43 is preferably positioned proximal or adjacent the body 13 (i.e., close to the bottom of the body 13) when the right extremity 17 is in the retracted position (see, e.g., FIG. 8) and distal or away from the body 13 (i.e., spaced away from the bottom of the body 13) when the right extremity 17 is in the extended position (see, e.g., FIG. 3). The right extremity 17 preferably includes a foot 49 attached to the lower end 47 of the leg 43. The right extremity 17 may be constructed as a one piece, integral unit or may be constructed as a multi-piece unit, out of various materials and in various shapes and sizes. For example, the right extremity 17 may be formed, molded, or otherwise constructed out of plastic, with the leg 43 and foot 49 consisting of a integral unit, configured and colored to closely resemble the leg and foot of an actual duck, goose, etc.

The left extremity 19 is substantially a mirror image of the right extremity 17, including a leg 51 having a first or upper end 53 extending through the left extremity aperture 31 in the body 13 and into the hollow interior 25 of the body 13, and a second or lower end 55, and including a foot 57 attached to the lower end 55 of the leg 51. The lower end 55 of the leg 51 is preferably positioned proximal or adjacent the body 13 (i.e., close to the bottom of the body 13) when the left extremity 19 is in the retracted position, and distal or away from the body 13 (i.e., spaced away from the bottom of the body 13) when the left extremity 19 is in the extended position. Like the right extremity 17, the left extremity 19 may be constructed as a one piece, integral unit or may be constructed as a multi-piece unit, out of various materials and in various shapes and sizes, and may be formed, molded, or otherwise constructed out of plastic, with the leg 51 and foot 57 consisting of a integral unit, configured and colored to closely resemble the leg and foot of an actual duck, goose, etc.

The right and left extremities 17, 19 are preferably joined to one another by a plate 59 extending between and joining the respective feet 49, 57. The plate 59 may have an aperture 61 therethrough substantially midway between the feet 49, 57 for allowing the shaft 33 of the support 15 to freely and slidably extend therethrough. The right extremity 17, left extremity 19, and plate 59 are preferably molded or otherwise constructed as a one-piece, integral unit out of plastic or the like.

The decoy 11 includes urging means 63 for urging the support 15 to the retracted position. The urging means 63 includes a spring 65 for forcing the support 15 to the retracted position.

The decoy 11 includes lock means 67 for locking the support 15 in the extended position, and opposing the force of the urging means 63. The lock means 67 includes a finger 69 movable between an unlocked position in which the shaft 33 of the support 15 can slide, or otherwise move, into the hollow interior 25 of the body 13 when so urged by the urging means 63, and a locked position in which the shaft 15 of the support 15 cannot move into the hollow interior 25 of the body 13, thereby opposing the force of the urging means 63. The lock means 47 may be designed so that the finger 69 thereof moves between the unlocked and locked positions when the shaft 33 of the support 15 is rotated about its longitudinal axis.

The urging means 63 and lock means 67 may be constructed as a unit including a tube 71 extending vertically from the support aperture 27 of the body 13 upward into the hollow interior 25 of the body 13. A screw 73 and block or wedge 73 may be used to anchor the upper end of the tube 71 to the body 13. The lower end of the tube 71 is secured to the body 13 in a manner so as to prevent rotation thereof. Thus, the support aperture 27 in the body 13 may have a notch or off-set portion 77 at one end (see FIG. 7), and an insert 79 may extend into and be attached to the lower end of the tube 71, with a enlarged lower end or flange 81 that covers the notch 77, and having a pin 83 that extends up from the flange 81 through the notch 77 into the interior 25 of the body 13 when the tube 71 is anchored to the body 13 in such a manner so as to help position and prevent rotation of the tube 71 relative to the body 13. The shaft 33 extends up through an aperture 85 in the insert 79, into the tube 71. An upper washer 87 is positioned on the upper end of the shaft 33 and is secured thereto by a cross pin 89 extending transversely through the shaft 33 above the upper washer 87. A lower washer 91 is positioned on the shaft 33 between the top of the insert 79 and the upper washer 87. The spring 65 preferably consist a typical coil spring positioned on the shaft 33, trapped between the upper washer 87 and lower washer 91. With the decoy 11 thus constructed and assembled, the spring 65 will normally pull or urge the support 15 to the raised, retracted position as shown in detail in FIG. 8. It will be noted that with the extremities 17, 19 positioned above the base 39 of the support 15, they will also be pushed or urged to the raised, retracted position by the plate 41, etc., when the spring 65 pulls or urges the support 15 to the raised, retracted position, and will fall to the extended position by gravity when the support 15 is moved to the extended position. The finger 69 of the lock means 67 may consist of a cross pin extending transversely through the shaft 33 for engaging the flange 81 about the bottom of the aperture 85 to prevent the spring 65 from pulling or urging the shaft 33 into the tube 71 to the raised, retracted position, thereby locking the stand in the extended position as shown in detail in FIG. 3. The insert 79 preferably has a slot 93 communicating with and extending the length of the aperture 85 to receive and allow the finger 69 to slide up and down therein so that the lock means 67 can be unlocked by merely rotating the shaft 33 about its longitudinal axis to align the finger 69 with the slot 93, and can be locked by merely rotating the shaft 33 about its longitudinal axis to position the finger 69 out of alignment with the slot 93 while the support 15 is manually pulled and held in the extended position. A transverse indent (not shown) may be provided in the bottom of the flange 81 across the aperture 85 for receiving the finger 69 when the support is in the extended position to act as a guide and stop when the shaft 33 is being rotated to the locked position. The indent is preferably 90° out of alignment with the slot 93 so that the shaft 33 need only be rotated 90° clockwise or counterclockwise to lock or unlock the support 15.

Although the present invention has been described and illustrated with respect to a preferred embodiment and a preferred use therefor, it is not to be so limited since modifications and changes can be made therein which are within the full intended scope of the invention.

The invention claimed is:

1. An avian decoy comprising:
   (a) a body having a hollow interior, said body having a support aperture in the bottom thereof;
   (b) an insert having a flange adapted for engagement with said bottom of said body;
   (c) a support coupled to said body and movable between a retracted position and an extended position, said support including a shaft having a first end positioned within said hollow interior of said body and a second end, said shaft extending through said insert;
   (d) lock means for locking said support in said extended position, said lock means including a finger movable between an unlocked position in which said support can move into said retracted position, and a locked position in which said finger engages said insert so that said support cannot move from said extended position into said retracted position; and
   (e) an extremity coupled to said body and movable between a retracted position and an extended position; said extremity including a foot and a leg; said leg of said extremity having a first end positioned within said hollow interior of said body and having a second end attached to said foot of said extremity, wherein said support and said extremity are movable into said hollow interior to obtain said retracted position.

2. The avian decoy of claim 1 in which is included urging means for urging said support to said retracted position.

3. The avian decoy of claim 2 in which said urging means includes a spring for forcing said support to said retracted position.

4. The avian decoy of claim 1 in which said finger of said lock means moves between said unlocked and locked positions when said shaft of said support is rotated.

5. An avian decoy comprising:
   (a) a body having a hollow interior, said body having a support aperture in the bottom thereof;
   (b) an insert having a flange adapted for engagement with said bottom of said body;
   (c) a support movable between a retracted position and an extended position; said support including a shaft having a first end positioned within said hollow interior of said body and a second end, said shaft extending through said insert; said support including a base attached to said second end of said shaft; said base of said support being positioned proximal to said body when said support is in said retracted position, and positioned distal to said body when said support is in said extended position;
   (d) a right extremity movable between a retracted position and an extended position; said right extremity including a right foot and a right leg; said right leg having a first end positioned within said hollow interior of said body and having a second end attached to said right foot;
   (e) a left extremity movable between a retracted position and an extended position; said left extremity including a left foot and a left leg; said left leg having a first end positioned within said hollow interior of said body and having a second end attached to said left foot;
   (f) urging means for urging said support, said right extremity, and said left extremity to said retracted positions, wherein said support and said left and right extremities are movable into said hollow interior to obtain said retracted position; and
   (g) lock means for locking said support in said extended position, said lock means including a finger movable between an unlocked position in which said support can move into said retracted position, and a locked position in which said finger engages said insert so that said support cannot move from said extended position into said retracted position.

6. The avian decoy of claim 5 in which said urging means includes a spring for forcing said support to said retracted position.

7. The avian decoy of claim 5 in which said finger of said lock means moves between said unlocked and locked positions when said shaft of said support is rotated.

* * * * *